March 18, 1958     R. E. MOULE     2,827,239
SERVO MECHANISM CONTROL FOR FUEL BURNER
Filed Sept. 23, 1954
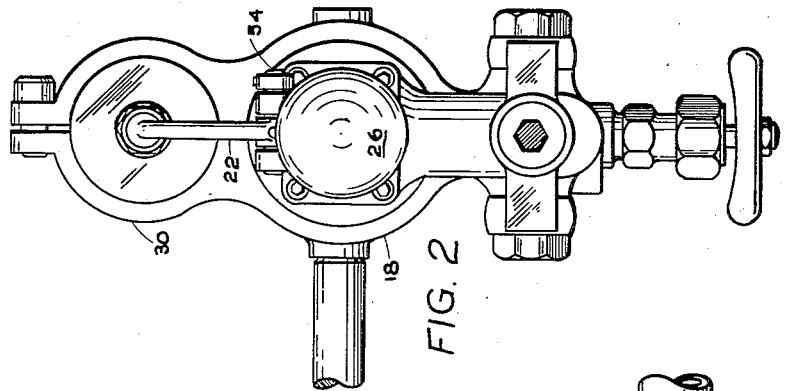
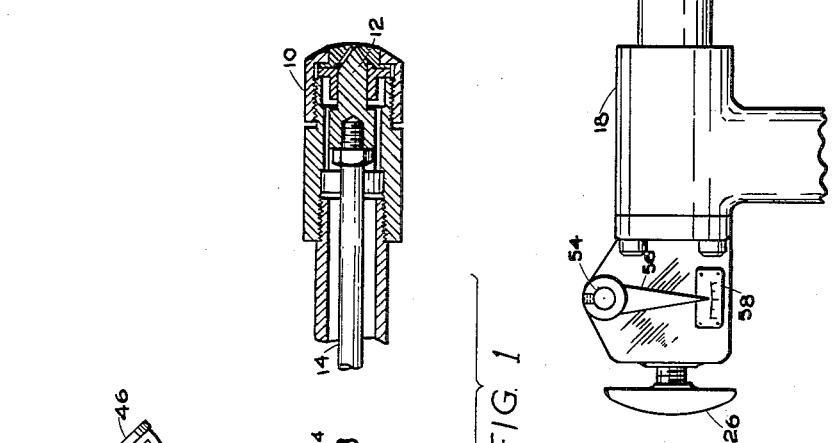
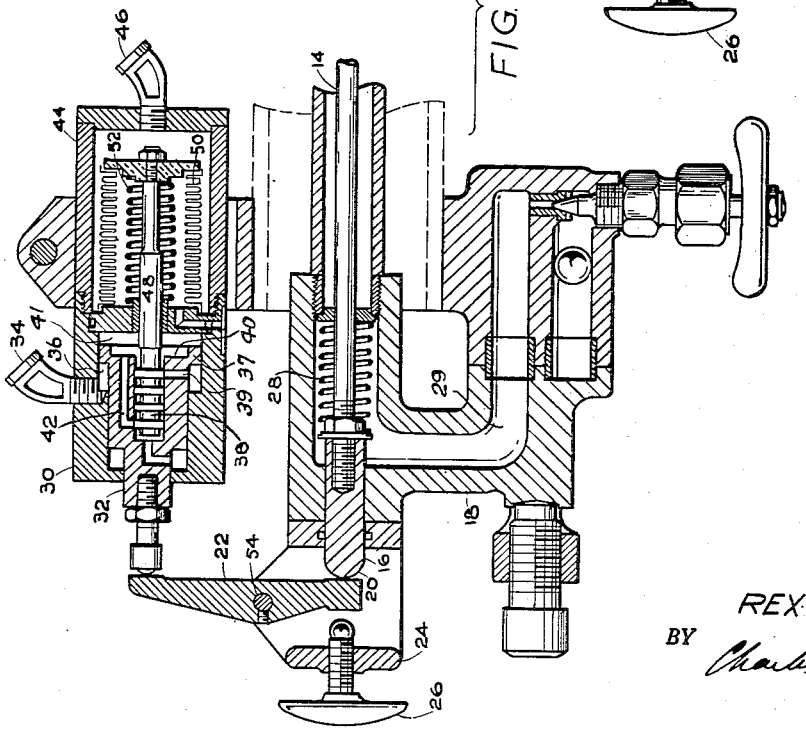
INVENTOR.
REX E. MOULE
BY Charles R Zay, atty.

United States Patent Office 2,827,239
Patented Mar. 18, 1958

2,827,239

SERVO MECHANISM CONTROL FOR FUEL BURNER

Rex E. Moule, Holden, Mass.

Application September 23, 1954, Serial No. 457,838

2 Claims. (Cl. 236—26)

This invention relates to a servo motor control for a mechanical atomizer such as an oil burner nozzle, and the principal object of the invention resides in the provision of power-operated means for controlling the degree of flow of combustible material so as to always maintain an even or desired pressure in a boiler or the like which is served by the oil burner or similar atomizer.

Another object of the invention resides in the provision of power-operated means for controlling the degree of opening or closing the orifice of a mechanical atomizer or similar device according to a predetermined condition, and particularly for maintaining a constant condition such as for instance the pressure in a boiler; the provision of a source of fluid under pressure, said fluid being provided with valve means controlled directly from the boiler or the like for admitting more or less fluid pressure to a main control for the atomizer, so that the pressure in the boiler or the like directly and proportionally controls the degree of fuel to be applied, whereby when the boiler pressure drops, the fuel will be automatically and immediately increased in order to bring the pressure back to normal.

Other objects and advantages of the invention will appear hereinafter.

Reference is to be had to the accompanying drawings, in which:

Fig. 1 is a sectional view through the apparatus according to the invention illustrating the same applied to an oil burner;

Fig. 2 is a view in elevation, looking in the direction of arrow 2 in Fig. 1; and Fig. 3 is a view in elevation illustrating an indicating means for the apparatus.

Particularly in large boilers, it is a problem to maintain pressures constant, there ordinarily being one or more burner tips or nozzles which are used for maintaining pressure in large boilers or in a battery of boilers, and the fuel consumption and efficiency of burning varies greatly, depending upon the conditions of the nozzle tips, etc., so that it is necessary to vary the flow of fuel to the nozzles in order to maintain constant boiler pressures.

In the present case, the nozzle tip assembly is illustrated by the numeral 10, and as is customary, the amount of oil flow is determined by the position of the needle 12 with reference to the usual aperture, this needle being moved backward and forward by means of a control rod 14 in order to vary the flow of the oil.

The rod 14 is connected to an end piece or the like indicated at 16 which extends through a housing 18 and terminates in a rounded or hemi-spherical surface at 20. The member 16 is slidable in an aperture provided for the purpose and is appropriately gasketed to prevent leakage of oil, etc.

Bearing on the rounded member, there is a lever indicated at 22. This lever is mounted on an extension 24 which also mounts in appropriate position a manual control wheel 26, the rod 14 being normally pressed toward the left by a spring 28 and a differential of oil pressure in chamber 29, the diameter of member 16 being greater than that of rod 14. The lever 22 moves the rod in the opposite direction.

There is provided a servo cylinder body 30 which may be mounted in any appropriate location with reference to the apparatus, and this cylinder contains a power piston 32 which moves to the left to move the lever 22 in a counterclockwise direction, or alternatively, piston 32 moves to the right to allow the rod 14 to move in a reverse direction.

Power is applied to this piston through an inlet pipe 34 and it is preferred that fluid under pressure be used for this purpose, this pressure being derived from a constant source which may be of commercial design. The inlet 34 communicates with chamber 36 containing an enlargement 37 on the power piston 32. This tends to urge the latter to the right. But this causes relative leftward motion of stem 38 and opens port 39, and then the fluid pressure impinges on the larger combined surface 40 at the right-hand end of the power cylinder, which then tends to move to the left, and to once more close port 39, by reason of the stem 38.

Fluid in chamber 41 is bled off through port 42, and the pressure in chamber 36, plus force of spring 28 and differential oil pressure in chamber 29, causes the power piston 32 to move to the right until port 42 is closed.

The means for controlling the ports 38 and 42 resides in an enclosure 44 which contains fluid or gases under pressure affected by the boiler pressure itself as by the inlet 46. The enclosure 44 provides a housing for a pilot piston rod 48 provided with a bellows assembly 50 and being constantly urged to the right in Fig. 1 against pressure due to the boiler gases by means of a central spring 52. This pilot piston extends into the power piston as clearly shown and is provided with rings on stem 38 closely engaging the interior cylindrical surface thereof for actuating the ports described above.

It will be seen that when pressure from the boiler is in excess of that desired, it will cause the pilot piston rod 48 to move to the left in Fig. 1, at least partially uncovering port 39 and providing for motion of the power piston 32 to the left under influence of the constant pressure fluid entering through inlet 34. This in turn of course causes lever 22 to move in a counter-clockwise direction, forcing the regulating rod 14 to lessen the effective aperture and thus reduces the fire. On the other hand, if the pressure in the boiler is reduced below that desired, spring 52 will urge the pilot valve 48 in the opposite direction, cutting off port 39 and providing for exhaust of fluid within the power cylinder 32, so that the regulating rod is allowed to move in the opposite direction to increase the fire.

The lever 22 is provided with a pivot-pin 54 to which it is fixed and this pin may be provided with a pointer 56 to indicate on a scale 58 the position of the lever and therefore of the power piston.

Having thus described my invention and the advantages thereof, I do not wish to be limited to the details herein disclosed, otherwise than as set forth in the claims, but what I claim is:

1. A servo-mechanism for controlling boiler pressure in a boiler having means for adjusting the nozzle of a fuel atomizer conducting fuel to the boiler, said servo-mechanism comprising a housing, a partition in said housing forming a pair of chambers therein, one of said chambers being in the form of a cylinder and the other chamber having a pipe connection thereto from the boiler, a power piston in the cylinder, movable means operated by the power piston in the motion thereof in one direction to vary the nozzle adjusting means, a spring urging said movable means in the other direction, a cylinder in said power piston, a pilot piston in the power piston cylinder, a pilot piston rod on the pilot piston and extending through said partition, a spring urging said rod in one direction against the pressure of the boiler in the chamber, the pressure of the boiler urging the rod in the other direction, a source of constant pressure, a connection therefor leading into the housing cylinder, said pilot piston rod moving said pilot piston with respect to said power piston under influence selectively of the boiler pressure or the second spring, and a port for connection of the source of constant pressure to the power piston, said port being opened and closed by the pilot piston travel.

2. A servo-mechanism for adjusting the nozzle of a fuel atomizer conducting fuel to a boiler, said servo-mechanism comprising a housing, a pair of chambers therein, one of said chambers being in the form of a cylinder and the other chamber having a connection thereto from the boiler, a power piston in the cylinder, a nozzle operating rod, means operated by the piston in the motion thereof in one direction to vary the position of the rod to control the nozzle, a spring to move the rod in the opposite direction, a cylinder in said power piston, a pilot piston in the cylinder in the power piston, a pilot piston rod connected to the pilot piston, a spring urging said rod in one direction against the pressure of the boiler in the other chamber, a source of constant pressure, a port therefor leading into the first-named cylinder, said pilot piston rod moving said pilot piston with respect to said power piston under influence selectively of the boiler pressure or the second spring to cover or uncover the port for connection of the source of constant pressure to the end of the power piston whereby the constant pressure moves the power piston to vary the fuel flow by moving the nozzle operating rod in one direction, and lack of such pressure provides that the first-named spring moves the nozzle operating rod in the other direction.

References Cited in the file of this patent
UNITED STATES PATENTS

| | | |
|---|---|---|
| 1,919,281 | Morrill | July 25, 1933 |
| 2,176,603 | Beleaf | Oct. 17, 1939 |
| 2,193,192 | Dueringer | Mar. 12, 1940 |
| 2,404,849 | Kimball | July 30, 1946 |
| 2,653,767 | Gillham | Sept. 29, 1953 |

FOREIGN PATENTS

| | | |
|---|---|---|
| 767,173 | Germany | Dec. 6, 1951 |